United States Patent [19]
Tokieda et al.

[11] Patent Number: 5,511,013
[45] Date of Patent: Apr. 23, 1996

[54] LOW POWER CONSUMPTION TYPE ONE-CHIP MICROCOMPUTER HAVING A PLURALITY OF PERIPHERAL CIRCUITS

[75] Inventors: Yusuke Tokieda; Hiroshi Katsuta, both of Tokyo, Japan

[73] Assignee: NEC Corporation, Tokyo, Japan

[21] Appl. No.: 274,004

[22] Filed: Jul. 12, 1994

[30] Foreign Application Priority Data

Jul. 12, 1993 [JP] Japan ..................... 5-193857

[51] Int. Cl.$^6$ ..................................... G06F 1/00
[52] U.S. Cl. .......................... 364/707; 395/750
[58] Field of Search ............... 364/707; 395/750; 365/230.02, 230.03

[56] References Cited

U.S. PATENT DOCUMENTS

| | | | |
|---|---|---|---|
| 4,694,393 | 9/1987 | Hirano et al. | 395/750 |
| 4,747,041 | 5/1988 | Engel et al. | 364/707 |
| 4,881,205 | 11/1989 | Aihara | 364/707 |
| 4,897,807 | 1/1990 | Ohsawa | 364/707 |

FOREIGN PATENT DOCUMENTS

| | | |
|---|---|---|
| 60-195631 | 10/1985 | Japan . |
| 61-285521 | 12/1986 | Japan . |
| 63-126018 | 5/1988 | Japan . |
| 64-86224 | 3/1989 | Japan . |

*Primary Examiner*—Tan V. Mai
*Attorney, Agent, or Firm*—Whitham, Curtis, Whitham & McGinn

[57] ABSTRACT

A microcomputer includes a plurality of peripheral circuits accessed by a central processing unit for a reading/writing of the peripheral circuits. Each of the external terminals supplies a selection signal indicative of use or non-use of a corresponding peripheral circuit. Each selection signal is supplied to a gate circuit provided for the corresponding peripheral circuit, for controlling permission and inhibition of application of a clock signal or a strobe signal to the corresponding peripheral circuit. Thus, neither the clock nor the strobe signal is supplied to the peripheral circuits which are not used in an actual application system, with the result that a low power consumption, highly reliable microcomputer is realized.

9 Claims, 3 Drawing Sheets

LOW POWER CONSUMPTION TYPE ONE-CHIP MICROCOMPUTER HAVING A PLURALITY OF PERIPHERAL CIRCUITS

BACKGROUND OF THE INVENTION

1. Field of the Invention

The present invention relates to a one-chip microcomputer having a plurality of peripheral circuits integrated together with a central processing unit and others on a single chip, and more specifically to a low power consumption one-chip microcomputer of this type.

2. Description of Related Art

In general purpose one-chip microcomputers, not only a central processing unit (CPU) and memories, but also various kinds of peripheral circuits including an AfD converter, a D/A converter, a timer, a serial interface and others for complying with various applications, are formed on a single chip.

Signals for controlling these various kinds of peripheral circuits formed on the microcomputer chip, include a clock signal generated in a clock generator for controlling an operation timing of each peripheral circuit, and a strobe signal generated in the CPU for controlling a timing of a data read/write operation to the peripheral circuits.

Referring to FIG. 1, there is shown a block diagram of one example of a conventional microcomputer including four peripheral circuits.

In the microcomputer shown in FIG. 1, a clock generator 1 generates a clock signal 2, which is supplied unconditionally and commonly to a central processing unit (CPU) 3 and all of four peripheral circuits 41, 42, 43 and 44. The clock signal 2 is used as a time reference, on the basis of which the operation order in time and the operation timing of the CPU 3 and the four peripheral circuits 41, 42, 43 and 44 are determined.

The CPU 3 and the four peripheral circuits 41, 42, 43 and 44 are coupled to each other through an address/data bus 5, and the CPU 3 supplies a strobe signal 6 to all of the four peripheral circuits 41, 42, 43 and 44 for the purpose of controlling a timing of the data read/write operation to the peripheral circuits 41, 42, 43 and 44. Accordingly, the timing of the data read/write operation of the CPU 3 to the peripheral circuits 41, 42, 43 and 44 is determined by this strobe signal 6.

In general, as mentioned above, the conventional general purpose microcomputer includes a plurality of peripheral circuits of various types formed on the single chip, in order to make it possible for the microcomputer to be used in different applications. In fact, however, when this general purpose microcomputer is used in an actual application system, all of the peripheral circuits formed on the microcomputer chip are not necessarily used.

Therefore, unconditional continuous application of the clock 2 and the strobe signal 6 to all of the peripheral circuits means that the clock and the strobe signal are applied to the peripheral circuits which are not used in the actual application system, and therefore, electric power is wastefully consumed.

Japanese Patent Application Laid-open Publication JP-A-60-195631 has disclosed a data processing system configured to reduce a wasteful electric power consumption. This data processing system is constructed to selectively supply a clock signal to peripheral circuits in accordance with a control signal from a CPU. For this purpose, the clock signal is applied to each of the peripheral circuits through a corresponding AND gate controlled by the control signal supplied from the CPU.

In initialization of a data processing program, the control signals to be respectively supplied to the peripheral circuits which are not used in the actual application system, are set to "0", so that the application of the clock to these peripheral circuits not to be used is inhibited, and on the other hand, the control signals to be respectively supplied to the peripheral circuits which are used in the actual application system, are set to "1", so that the clock is supplied to these peripheral circuits to be used.

Furthermore, Japanese Patent Application Laid-open Publication JP-A-61-285521 has proposed a low power consumption microcomputer, which includes a gate for on-off controlling the application of the clock to peripheral circuits coupled to the microcomputer, and a clock signal control means for putting the above mentioned gate into an off condition when each peripheral circuit does not actually operate, and for opening the above mentioned gate only when each peripheral circuit actually operates so that the clock is actually supplied to the peripheral circuits. Thus, on the basis of a program, the peripheral circuits are controlled to be selectively put into the operating condition.

Furthermore, a reset signal is applied to a designated peripheral circuit at a designated timing, so that, in a peripheral circuit of the type requiring a clock for the purpose of maintaining an initialized condition after resetting, it is possible to reduce the electric power consumption caused by the clock application after the reset inputting until the peripheral circuit is actually used, whereby a lower power consumption computer can be realized.

In addition, Japanese Patent Application Laid-open Publication JP-A-64-86224 shows a stand-by circuit for a microcomputer, which is configured so that, not only a CPU but also peripheral circuits can be selectively stopped when the system is put into a stand-by mode by executing a clock stop instruction in the process of a program execution by a CPU. For this purpose, a peripheral hardware controlling circuit is provided, which receives hardware stop information included in the clock stop instruction from the CPU, and selectively supplies a dock stop signal to a plurality of peripheral hardware, for the purpose of reducing the electric power consumption in the stand-by mode.

On the other hand, it is very significant to reduce the power consumption of the microcomputer, in particular in a battery cell driven, microcomputer-controlled, small-sized apparatus, such as a portable telephone and a camera.

In the microcomputer shown in FIG. 1, since the clock and the strobe signal are supplied to the peripheral circuits which are never used in the actual application system, the wasteful electric power consumption is inevitable. However, all the data processing systems proposed in the above mentioned Japanese patent application publications for overcoming this drawback are so constructed that, for realizing a lower power consumption, the application of the clock to the peripheral circuits is on/off-controlled in accordance with a program of the CPU. However, it is actually difficult to easily change the setting of the use or non-use of each peripheral circuit, since it causes possibility of an error in the program, and hence, in the programmed operation, and therefore, there is a possibility of losing reliability of the system. In fact, there is almost no case in which the peripheral circuits used in the system are dynamically switched over in the course of a program execution.

Furthermore, the method of reducing the electric power consumption caused by the clock required for maintaining the initialized condition by realizing the reset input in a programmed operation and rendering off the clock used in the peripheral circuits, is effective only for some peripheral circuits requiring the clock for maintaining the initialized condition, and only when the microcomputer system starts to be used or operated. Therefore, a large advantage cannot be expected if the whole of the microcomputer is considered and if the whole of the use time is considered.

In addition, all of the above mentioned low power consumption data processing systems are constructed to control on-off of only application of the clock to the peripheral circuits, and therefore, to unconditionally continuously supply various strobe signals to an address register, data registers and the like. Because of this, the electric power consumption cannot be satisfactorily reduced.

Furthermore, provision in the program of a special clock stop control instruction for controlling the stoppage of the application of the clock to the peripheral circuits, results in an increase of circuit elements such as an instruction decoder in the CPU.

SUMMARY OF THE INVENTION

Accordingly, it is an object of the present invention to provide a one-chip microcomputer which has overcome the above mentioned defect of the conventional one.

Another object of the present invention is to provide a one-chip microcomputer having a plurality of peripheral circuits and capable of controlling application of the clock and the strobe signal to the peripheral circuits, without using a program instruction, for making it possible to construct a low power consumption, highly reliable system.

The above and other objects of the present invention are achieved in accordance with the present invention by a microcomputer comprising at least a central processing unit, a plurality of peripheral circuits accessed by the central processing unit for a reading/writing of the peripheral circuits, selection means for generating a selection signal for each of the peripheral circuits, the selection signal being indicative of use or non-use of the corresponding peripheral circuit, and means for controlling permission and inhibition of application of a clock signal and a strobe signal to each of the peripheral circuit on the basis of the selection signal for each peripheral circuit.

In one embodiment of the microcomputer, the selection means is constituted of at least one external terminal of the microcomputer.

In another embodiment of the microcomputer, the selection means includes a memory means for holding selection information indicative of use or non-use of each of the peripheral circuits, the memory means supplying the selection signal to each of the peripheral circuits on the basis of the selection information held in the memory means, and at least one external terminal connected to the memory means for writing the selection information into the memory means only at the time of resetting the microcomputer.

The above and other objects, features and advantages of the present invention will be apparent from the following description of preferred embodiments of the invention with reference to the accompanying drawings.

DESCRIPTION OF THE PREFERRED EMBODIMENTS

Figure 1:
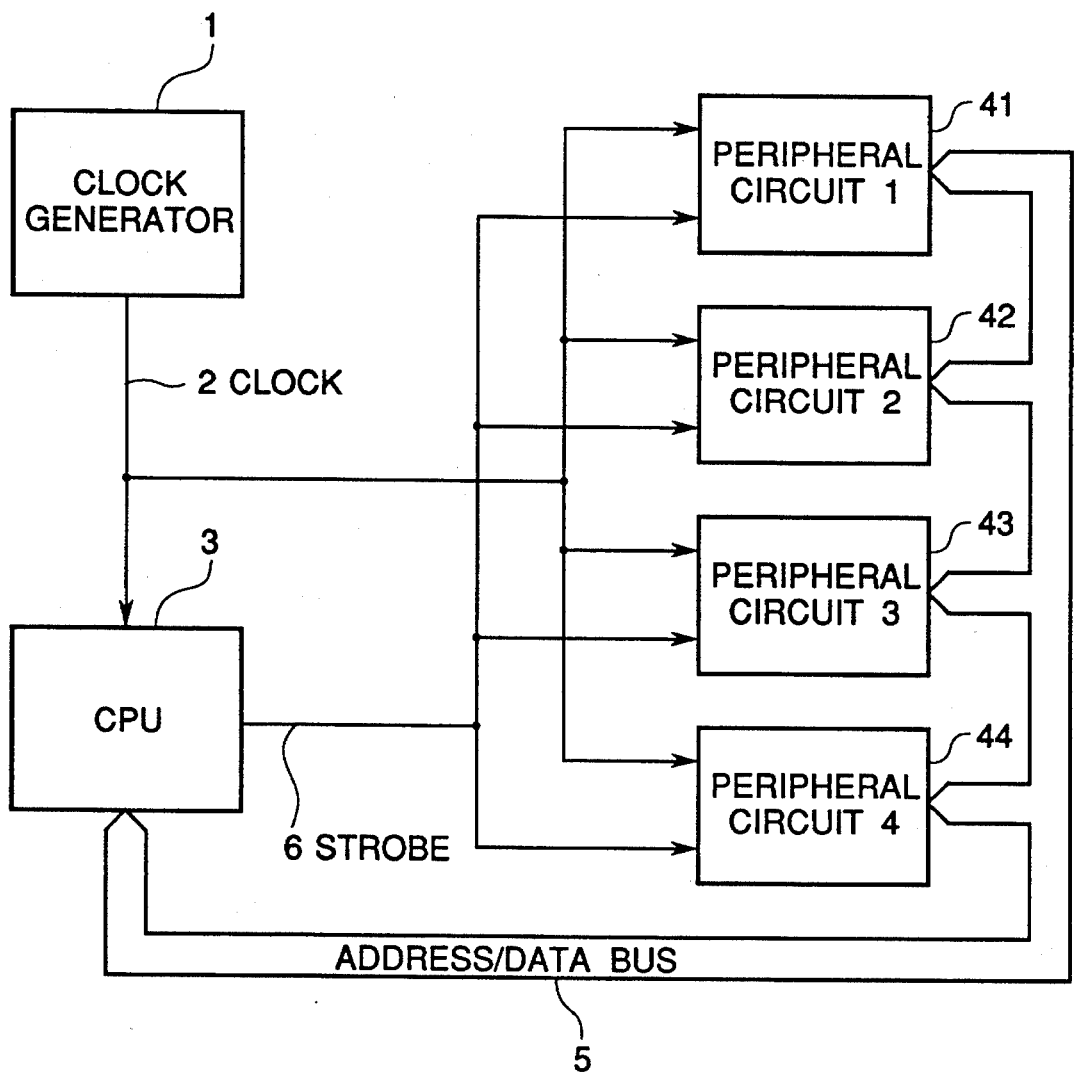
FIG. 1 is a block diagram of one example of a conventional microcomputer including four peripheral circuits.
Figure 2:
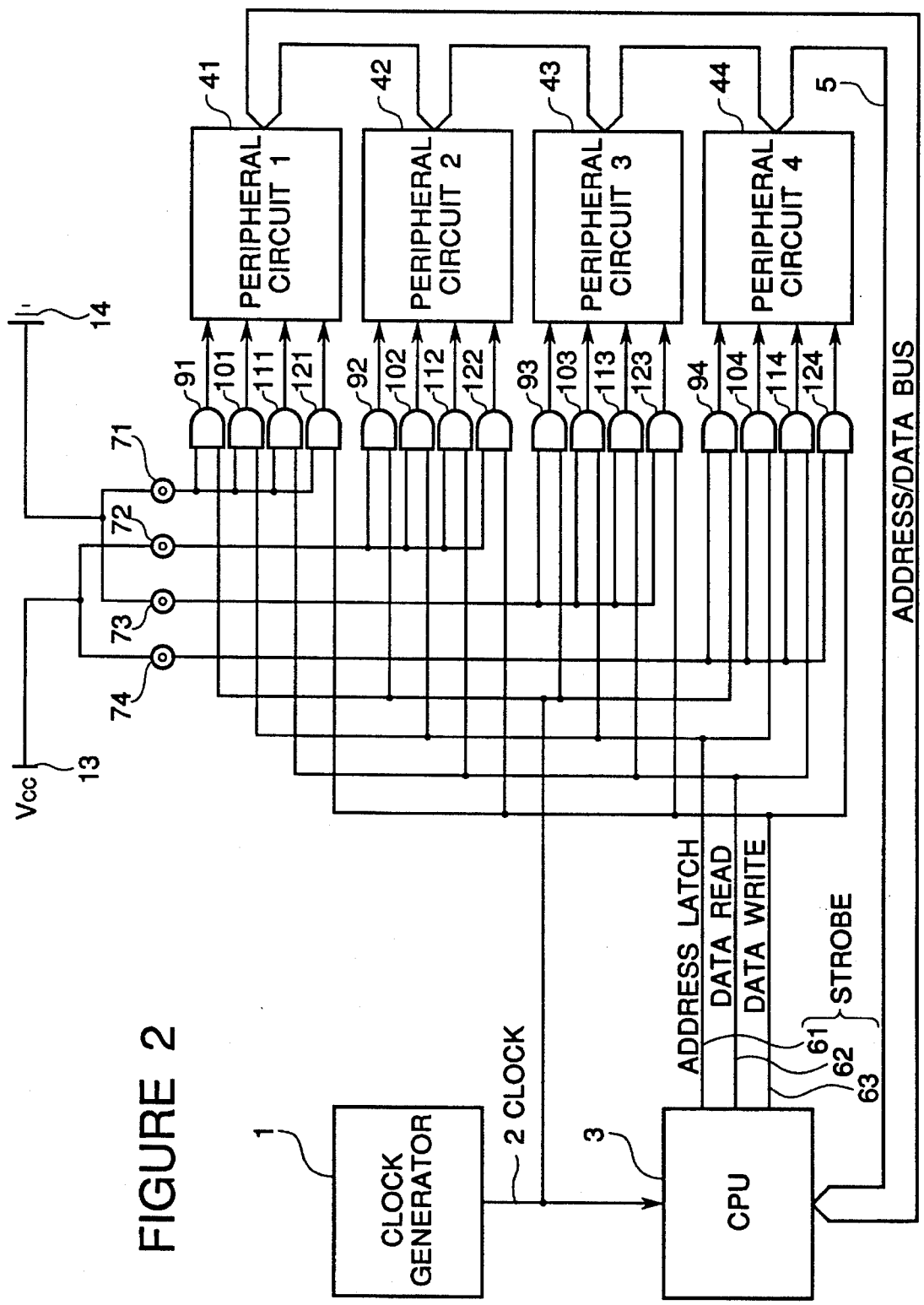
FIG. 2 is a block diagram of a first embodiment of the microcomputer in accordance with the present invention.

Referring to FIG. 2, there is shown a block diagram of a first embodiment of the microcomputer in accordance with the present invention. In FIG. 2, elements similar to those shown in FIG. 1 are given the same Reference Numerals, and explanation thereof will be omitted for simplification of description.

The shown embodiment includes four special external terminals 71, 72, 73 and 74 provided for the four peripheral circuits 41, 42, 43 and 44, respectively. Each of the external terminals is used to supply selection information for a corresponding peripheral circuit. For example, when the corresponding peripheral circuit is to be used in an application system, the selection information assumes a logical value "1", and when the corresponding peripheral circuit is not to be used in the application system, the selection information assumes a logical value "0".

The external terminal 71 is connected to one input of each of four AND gates 91, 101, 111 and 121, each of which has its output connected to the peripheral circuit 41. The other input of the AND gate 91 is connected to receive the clock signal 2 from the clock generator 1, and the respective other inputs of the AND gates 101, 111 and 121 are connected to receive three different strobe signals 61, 62 and 63 generated in the CPU 3, respectively. The external terminal 72 is connected to one input of each of four AND gates 92, 102, 112 and 122, each of which has its output connected to the peripheral circuit 42. The other input of the AND gate 92 is connected to receive the clock signal 2, and the respective other inputs of the AND gates 102, 112 and 122 are connected to receive the strobe signals 61, 62 and 63, respectively.

Similarly, the external terminal 73 is connected to one input of each of four AND gates 93, 103, 113 and 123, each of which has its output connected to the peripheral circuit 43. The other input of the AND gate 93 is connected to receive the clock signal 2, and the respective other inputs of the AND gates 103, 113 and 123 are connected to receive the strobe signals 61, 62 and 63, respectively. In addition, the external terminal 74 is connected to one input of each of four AND gates 94, 104, 114 and 124, each of which has its output connected to the peripheral circuit 44. The other input of the AND gate 94 is connected to receive the clock signal 2, and the respective other inputs of the AND gate 104, 114 and 124 are connected to receive the strobe signals 6I, 62 and 63, respectively..

Figure 3:
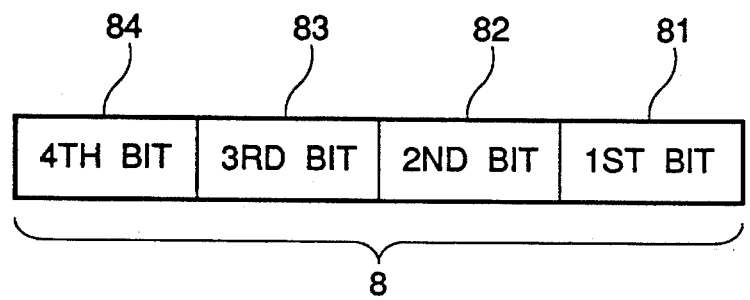
FIG. 3 illustrates selection information used in the microcomputer in accordance with the present invention.

Referring to FIG. 3, there is shown a bit structure of the selection information, generally designated with Reference Numeral 8. The selection information 8 is composed of a first bit 81 indicative of use/non-use of the peripheral circuit 41, a second bit 82 indicative of use/non-use of the peripheral circuit 42, a third bit 83 indicative of use/non-use of the peripheral circuit 43, and a fourth bit 84 indicative of use/non-use of the peripheral circuit 41. Therefore, if the first bit 81 is at the logical value "1", it means use of the peripheral circuit 41, and if the first bit 81 is at the logical value "0", it means non-use of the peripheral circuit 41.

The respective bits of the selection information 8 can be determined and given by connecting each of the external terminals 71, 72, 73 and 74 to either a voltage supply voltage 13 (Vcc) or ground 14 on an application system board when an application system using the shown microcomputer is constructed by a user. When the external terminal is connected to the voltage supply voltage 13, the selection information of the logical value "1" is given, and when the external terminal is connected to the ground 14, the selection information of the logical value "0" is given. In the shown embodiment, the external terminals 72 and 74 are connected to the voltage supply voltage 13, and the external terminals 71 and 73 are connected to the ground 14.

Thus, the clock 2 generated by the clock generator 1 is supplied to the peripheral circuits 41, 42, 43 and 44 through the AND gates 91, 92, 93 and 94, respectively, which are controlled by the special external terminals 71, 72, 73 and 74, respectively. Therefore, the external terminals set to the logical value "0" keep the corresponding AND gates in a closed condition, so that the clock is not supplied to the corresponding peripheral circuits. On the other hand, the external terminals set to the logical value "1" maintain the corresponding AND gates in an open condition, so that the clock is supplied to the corresponding peripheral circuits.

On the other hand, the CPU 3 and the respective peripheral circuits 41, 42, 43 and 44 are coupled to each other through the address/data bus 5. Each of the peripheral circuits 41, 42, 43 and 44 includes a plurality of registers (not shown) each allocated with an identification address for designating a register. These registers are used for setting an operation condition of the peripheral circuit, for storing an initial data, and for other purposes. The strobe signals 61, 62 and 63 generated in the CPU 3 includes an address latch signal 61, a data read signal 62, and a data write signal 63.

The address latch signal 61 is used for controlling a timing where an address for designating a register in the peripheral circuit is fetched into each peripheral circuit from the address/data bus 5 in the data read/write operation. The data read signal 62 is used for controlling a timing where a content of a designated register in the peripheral circuit is read out to the address/data bus 5. The data write signal is used for controlling a timing where a designated register in the peripheral circuit is written with a content of the address/data bus 5.

As mentioned above, the address latch signal 61 is supplied to the peripheral circuits 41, 42, 43 and 44 through the AND gates 101, 102, 103 and 104, respectively, which are controlled by the special external terminals 71, 72, 73 and 74, respectively. The data read signal 62 is supplied to the peripheral circuits 41, 42, 43 and 44 through the AND gates 111, 112, 113 and 114, respectively, which are also controlled by the special external terminals 71, 72, 73 and 74, respectively. Furthermore, the data write signal 63 is supplied to the peripheral circuits 41, 42, 43 and 44 through the AND gates 121, 122, 123 and 124, respectively, which are also controlled by the special external terminals 71, 72, 73 and 74, respectively.

Therefore, the external terminals set to the logical value "0" keep the corresponding AND gates in a closed condition, so that none of the strobe signals is supplied to the corresponding peripheral circuits. On the other hand, the external terminals set to the logical value "1" maintain the corresponding AND gates in an open condition, so that the strobe signals can be supplied to the corresponding peripheral circuits.

In the shown example, the external terminals 71 and 73 set to the logical value "0" blocks the corresponding AND gates 91, 101, 111 and 121, and 93, 103, 113 and 123, so that none of the clock 2 and the strobe signals 61, 62 and 63 is supplied to the corresponding peripheral circuits 41 and 43. On the other hand, the external terminals 71 and 73 set to the logical value "1" maintain the corresponding AND gates 92, 102, 112 and 122, and 94, 104, 114 and 123 in the open condition, so that the clock 2, the address latch signal 61, the data read signal 62 and the data write signal 63 can be supplied to the corresponding peripheral circuits 42 and 44.

In the above mentioned first embodiment, when an application system is constructed by a user, if the respective bits of the special external terminals 71, 72, 73 and 74 are set by the user, it is possible to previously select the peripheral circuits to be supplied with the clock 2 and the strobe signals 61, 62 and 63. Selection or designation of the use/non-use of the respective peripheral circuits 41, 42, 43 and 44, namely, the selection bits applied to the special external terminals 71, 72, 73 and 74, are not ordinarily changed in the same application system.

Figure 4:
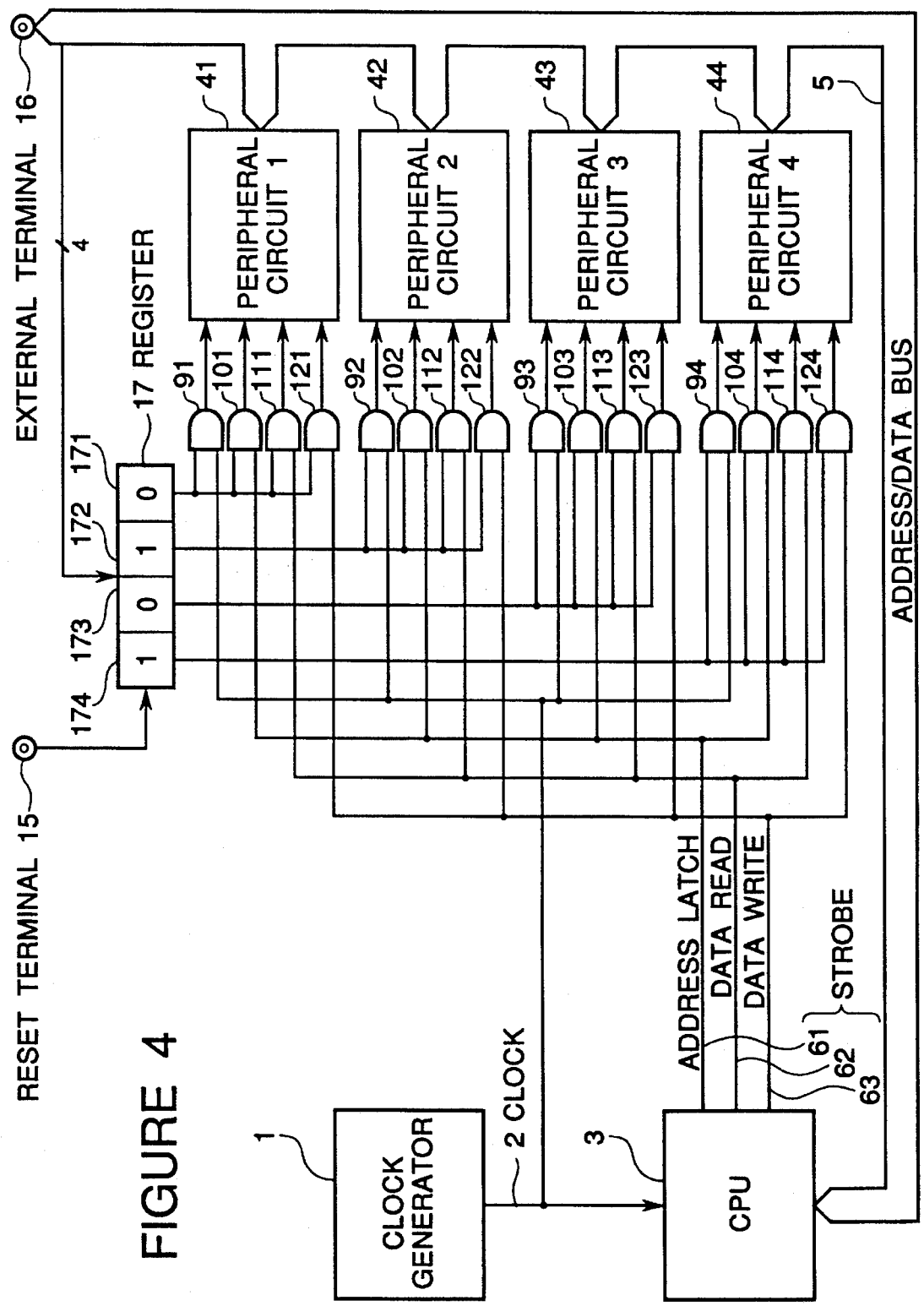
FIG. 4 is a block diagram of a second embodiment of the microcomputer in accordance with the present invention.

Referring to FIG. 4, them is shown a block diagram of a second embodiment of the microcomputer in accordance with the present invention. In FIG. 4, elements similar to those shown in FIG. 2 are given the same Reference Numerals, and explanation thereof will be omitted for simplification of description.

As will be apparent from comparison between FIGS. 2 and 4, a register 17 having a first bit 171, a second bit 172, a third bit 173 and a fourth bit 174 is provided in place of the external terminals 71, 72, 73 and 74 in the first embodiment. The register 17 is coupled to four bits of the address/data bus 5 coupled to an external terminal 16, and controlled through a reset terminal 15 in such a manner that, when a system is reset by activating the reset terminal 15, the first to fourth bits 81, 82, 83 and 84 of the selection information 8 are read through the external terminal 16 and set to the first to fourth bits 171, 172, 173 and 174 of the register 17, respectively.

In the second embodiment, the external terminal 16 is used for reading the selection information 8 indicative of the use/non-use of the respective peripheral circuits 41, 42, 43 and 44, only at the time of resetting. In a condition other than the resetting, the external terminal 16 is used as an external address/data terminal for the address/dam bus, for making it possible for the CPU 3 to access an external device of the microcomputer, such as a memory, an input/output device and others. Therefore, since the terminal function is multiplexed, a total number of terminals of the microcomputer can be reduced.

Operation of the second embodiment is the same as that of the first embodiment, excepting for the operation for setting the register 17. Therefore, a further explanation of the operation of the second embodiment will be omitted.

Thus, in the second embodiment, by determining the selection information 8 to be supplied to the register 17 at the time of resetting the microcomputer, it is possible to select the peripheral circuits to which the clock 2 and the strobe signals 61, 62 and 63 are to be supplied, similarly to the first embodiment. In this connection, the use/non-use of the respective peripheral circuits 41, 42, 43 and 44 determined at the time of the resetting, namely, the logical value "1" or "0" of the respective bits 171, 172, 173 and 174 of the register 17 set at the time of the resetting, is not changed until a next resetting.

In the above mentioned embodiments, the four peripheral circuits are integrated together with the microcomputer. However, it will be apparent to persons skilled in the art that the present invention can be applied to microcomputers having more than four peripheral circuits.

For example, assume that a microcomputer includes ten peripheral circuits (including timers, A/D converters, D/A converters, etc.) and five peripheral circuits of the ten peripheral circuits are not used in an actual application system. If the clock and the strobe signals are inhibited from being supplied to the five peripheral circuits not to be used, the power consumption in connection with the peripheral circuits can be reduced by about 50% in comparison with a case in which the clock and the strobe signals are supplied to all of the ten peripheral circuits integrated on the microcomputer chip. This power consumption reduction effect becomes large if the number or proportion of the peripheral circuits not to be used becomes large.

In the present invention, in addition, since not only the clock but also the strobe signals are inhibited from being supplied to the peripheral circuits not to be used, the power consumption reduction effect is larger than the case of inhibiting application of only the clock.

Furthermore, it is constructed to selectively set, through the external terminals, the supply and non-supply of the clock and the strobe signals to the respective peripheral circuits. Alternatively, it is constructed to selectively set, only once, the supply and non-supply of the clock and the strobe signals to the respective peripheral circuits, by means of the memory means (such as the register) which is set, at the time of the resetting, on the basis of the use/non-use information of the peripheral circuits. Therefore, since the setting of the supply to the clock and the strobe signals to the respective peripheral circuits cannot be changed by means of a program, it is possible to make zero (0) possibility of a malfunction caused by changing the program. Accordingly, reliability of the microcomputer system can be elevated.

The invention has thus been shown and described with reference to the specific embodiments. However, it should be noted that the present invention is in no way limited to the details of the illustrated structures but changes and modifications may be made within the scope of the appended claims.

We claim:

1. A microcomputer comprising:

a central processing unit;

a plurality of peripheral circuits accessed by said central processing unit for a reading/writing of said peripheral circuits;

selection means for generating a selection signal for each of said peripheral circuits, said selection signal being indicative of use or non-use of the corresponding peripheral circuit; and means for controlling, without using a program instruction of the microcomputer, permission and inhibition of application of a clock signal and a strobe signal to each of said peripheral circuits on the basis of said selection signal for said each of said peripheral circuits, wherein said selection means comprises at least one external terminal of the microcomputer.

2. A microcomputer according to claim 1, wherein said at least one external terminal is provided in a number corresponding to a number of said plurality of peripheral circuits.

3. A microcomputer according to claim 1, further comprising a voltage supply circuit and a ground, wherein bits of said selection information are provided by selectively connecting said at least one external terminal to one of said voltage supply circuit and said ground.

4. A microcomputer comprising:

a central processing unit;

a plurality of peripheral circuits accessed by said central processing unit for a reading/writing of said peripheral circuits;

selection means for generating a selection signal for each of said peripheral circuits, said selection signal being indicative of use or non-use of the corresponding peripheral circuit; and means for controlling, without using a program instruction of the microcomputer, permission and inhibition of application of a clock signal and a strobe signal to each of said peripheral circuits on the basis of said selection signal for said each of said peripheral circuits, wherein said selection means includes memory means for holding selection information indicative of use or non-use of each of said peripheral circuits, said memory means supplying said selection signal to each of said peripheral circuits on the basis of the selection information held in said memory means, and at least one external terminal connected to said memory means for writing said selection information into said memory means only at a time of resetting the microcomputer.

5. A microcomputer according to claim 4, wherein said memory means includes a plurality of bits, said plurality of bits being provided in a number corresponding to a number of said plurality of peripheral circuits.

6. A microcomputer according to claim 4, further comprising means for resetting said microcomputer, wherein said at least one external terminal reads said selection information indicative of the use or non-use of the respective peripheral circuit only at the time of resetting of said microcomputer.

7. A microcomputer according to claim 4, further comprising and address/data bus for coupling said at least one external terminal to each of said plurality of peripheral circuits and to said central processing unit, said microcomputer further comprising means for resetting said microcomputer coupled to said memory means, wherein said at least one external terminal reads said selection information indicative of the use or non-use of the respective peripheral circuit only at the time of resetting of said microcomputer.

8. A microcomputer comprising:

a central processing unit;

a plurality of peripheral circuits accessed by said central processing unit for a reading/writing of said peripheral circuits;

selection means for generating a selection signal for each of said peripheral circuits, said selection signal being indicative of use or non-use of the corresponding peripheral circuit; and means for controlling, without using a program instruction of the microcomputer, permission and inhibition of application of a clock signal and a strobe signal to each of said peripheral circuits on the basis of said selection signal for said each of said peripheral circuits, wherein said selection means comprises at least one external terminal and wherein said controlling means comprises an AND gate for receiving a first input from said at least one external terminal and for receiving a second input from a clock generating circuit, and wherein said AND gate is selectively placed in one of an open condition and a closed condition based on said first and second inputs.

9. A microcomputer according to claim 8, wherein said controlling means comprises a second AND gate for receiving a first input from said at least one external terminal and for receiving a second input from a strobe signal generating circuit, wherein said second AND gate is selectively placed in one of an open condition and a closed condition based on said first and second inputs respectively received from said at least one external terminal and said strobe signal generating circuit.

* * * * *